(12) United States Patent
Al-Hamouz et al.

(10) Patent No.: US 8,626,350 B2
(45) Date of Patent: Jan. 7, 2014

(54) SLIDING MODE AGC CONTROLLER AND METHOD

(75) Inventors: Zakariya M. Al-Hamouz, Dhahran (SA); Hussain N. Al-Duwaish, Dhahran (SA); Naji A. Al-Musabi, Abu Dhabi (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 928 days.

(21) Appl. No.: 12/662,377

(22) Filed: Apr. 14, 2010

(65) Prior Publication Data

US 2011/0257799 A1      Oct. 20, 2011

(51) Int. Cl.
*G06F 1/26*      (2006.01)

(52) U.S. Cl.
USPC .................. 700/287; 700/28; 706/13

(58) Field of Classification Search
USPC ............... 700/28, 32, 33, 34, 37, 38, 40, 286, 700/287; 706/13
See application file for complete search history.

(56) References Cited

U.S. PATENT DOCUMENTS

| | | | |
|---|---|---|---|
| 6,411,944 B1* | 6/2002 | Ulyanov | 706/13 |
| 6,415,272 B1* | 7/2002 | Ulyanov | 706/2 |
| 6,578,018 B1* | 6/2003 | Ulyanov | 706/14 |
| 6,578,176 B1* | 6/2003 | Wang et al. | 716/133 |
| 6,721,718 B2* | 4/2004 | Ulyanov | 706/2 |
| 7,383,235 B1* | 6/2008 | Ulyanov et al. | 706/13 |
| 2002/0078429 A1* | 6/2002 | Yoshida | 716/21 |
| 2007/0120424 A1 | 5/2007 | Lombardi et al. | |
| 2009/0083680 A1* | 3/2009 | McConaghy et al. | 716/3 |

OTHER PUBLICATIONS

A Tabu Search Approach for the Design of Variable Structure Load Frequency Controller Incorporating Model Nonlinearities, Journal of Electrical Engineering, vol. 58, No. 5, 2007, 264-270.

* cited by examiner

*Primary Examiner* — Charles Kasenge
(74) *Attorney, Agent, or Firm* — Richard C. Litman

(57) ABSTRACT

The sliding mode AGC controller and method includes Genetic Algorithms (GA) to find the optimal feedback gains and switching vector values of the controller. In order to provide enhancement of the system dynamical performance and a reduction in the SMC chattering, two objective functions are provided in the optimization process. The tested two-area interconnected AGC model incorporates nonlinearities in terms of Generation Rate Constraint (GRC) and a limiter on the integral control value. Comparison with previous AGC methods reported in the literature validates the significance of the sliding mode AGC controller.

4 Claims, 10 Drawing Sheets

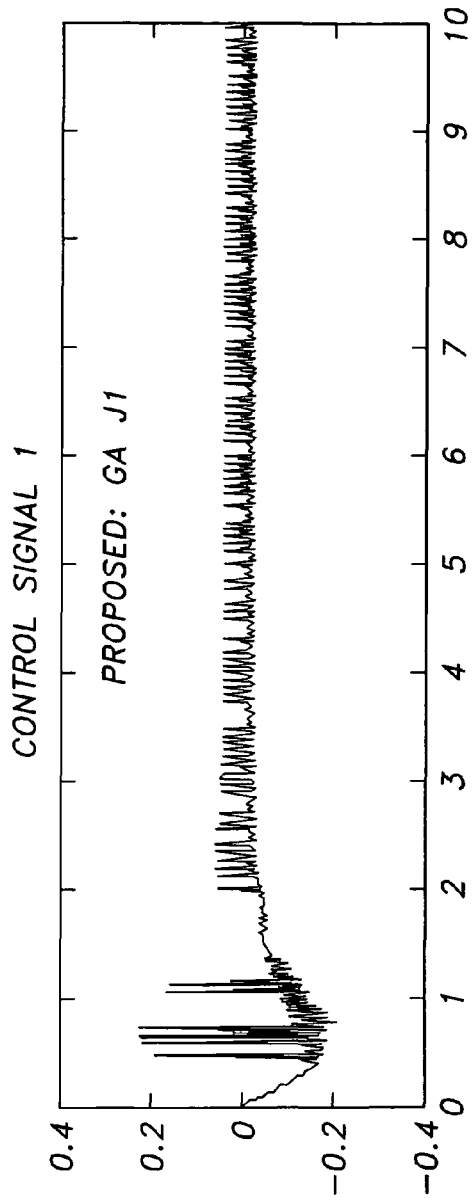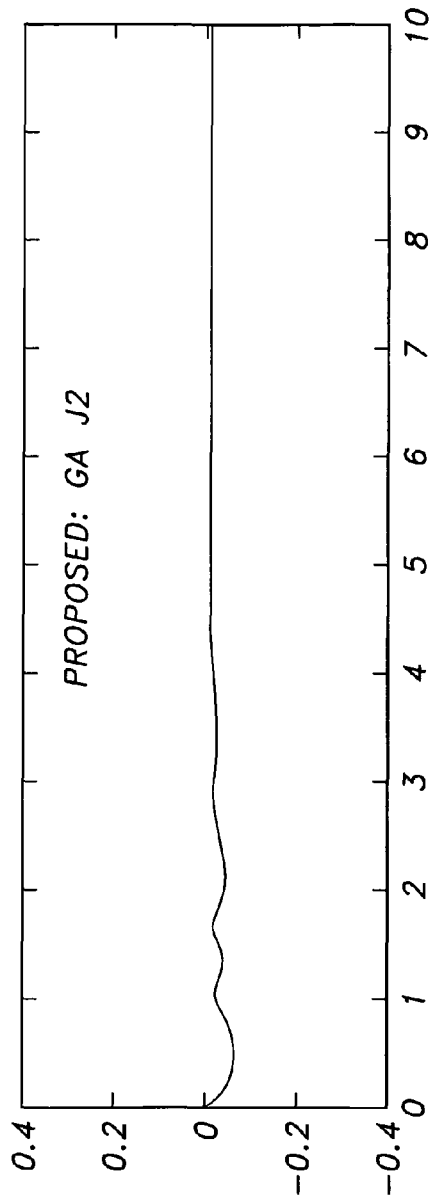

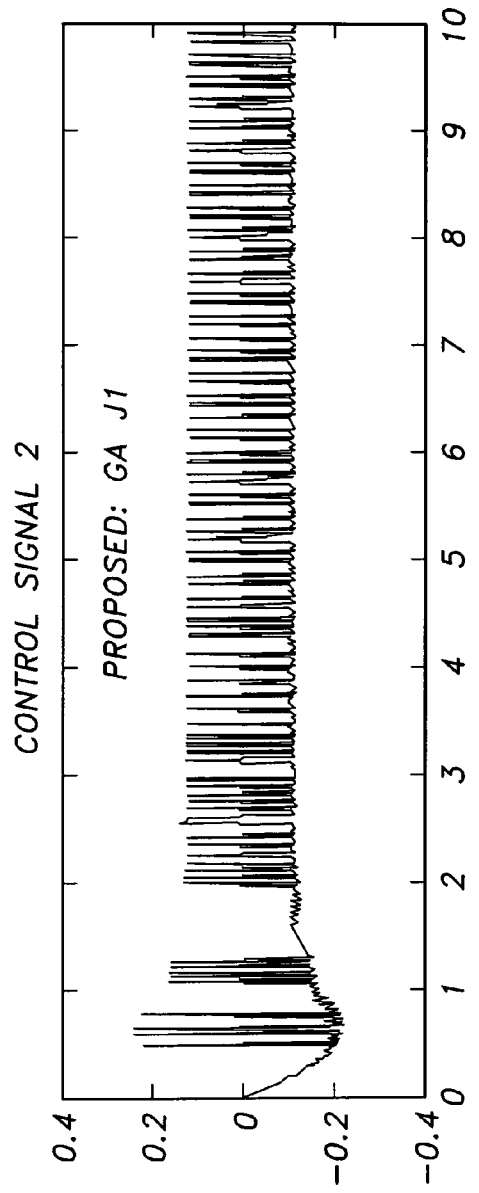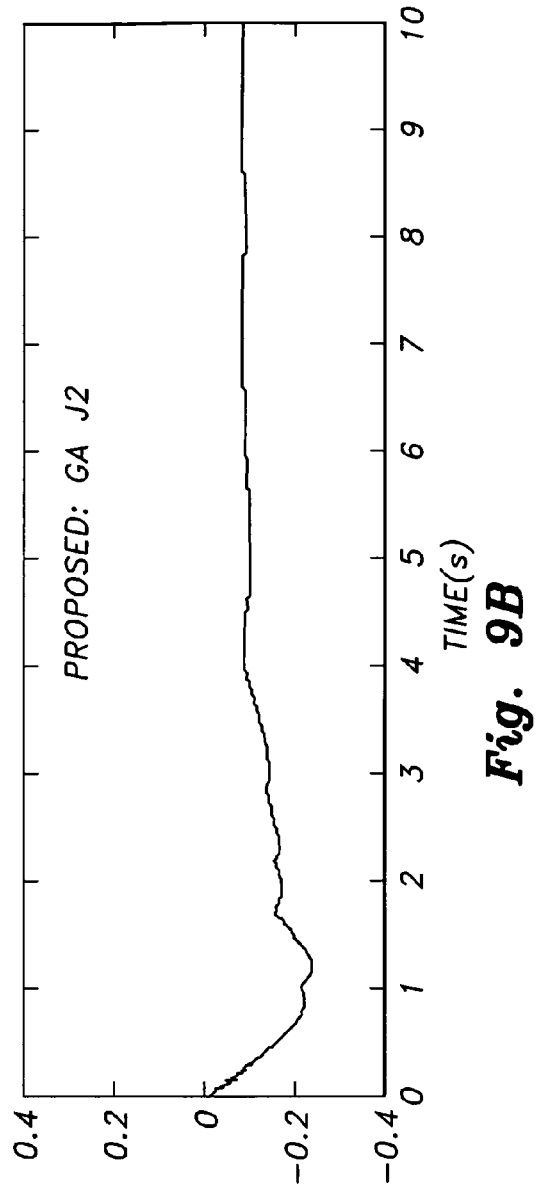
Fig. 9A
Fig. 9B

SLIDING MODE AGC CONTROLLER AND METHOD

BACKGROUND OF THE INVENTION

1. Field of the Invention

The present invention relates to a electrical control devices and circuits, and particularly to a sliding mode AGC controller and method that provides a chattering reduction feature applied to interconnected automatic generation control (AGC).

2. Description of the Related Art

The Automatic Generation Control (AGC) problem has been one of the most important issues in the operation and design of contemporary electric power systems. This importance is due to the role of the AGC in securing satisfactory operation of power systems and ensuring constancy of speed for induction and synchronous motors, thereby improving the performance of generating units. The purpose of AGC is to track load variation while maintaining system frequency and tie line power interchanges (for interconnected areas) close to specified values. In this way, transient errors in frequency and tie line power should be minimized, and steady error should not appear.

In the last two decades, many techniques were proposed for the supplementary control of AGC systems. Conventionally, PI and PID controllers are used for AGC. However, PI has many drawbacks, some of which are long settling time and relatively large overshoots in the transient frequency deviations. Furthermore, utilization of optimal control theory has already been examined. The controller design is normally based on the parameters of the linear incremental model of the power system, which, in turn, depend on the condition of the power system. Therefore, the linear optimal controller is sensitive to variations in the plant parameters or operating conditions of the power system. Moreover, the linear optimal controller yields unsatisfactory dynamic response in the presence of Generation Rate Constraint. Other techniques used for designing the secondary control loop for the AGC include Neural Network methods, Superconducting Magnetic Energy Storage (SMES) unit applications, and spline techniques.

Furthermore, the application of a sliding mode controller (SMC) to the AGC problem was considered by many authors. SMC possesses some attractive features, including robustness and good transient response. In the literature, a SM controller has been compared with conventional and optimal control methods for two equal-area non-reheat and reheat thermal systems. However, a systematic method for obtaining the switching vector and optimum feedback gain of the SMC has heretofore not been discussed. Pole placement technique has been utilized in designing the SMC for a single area non-reheat AGC system in previous work, in which the feedback gains were selected by trial and error.

In practice, AGC models are nonlinear. Unfortunately, conventional control design methods are not efficient when nonlinearities are introduced to the incremental models of control systems. Thus, other methods should be utilized for the design of the controllers. One of the most reliable techniques is the iterative heuristic optimization algorithms, which can be used to tune the controllers to obtain their optimum settings. Some of the recent attempts that utilized the iterative heuristic algorithms for solving the AGC problems (for linearized models) can be found in previous work.

Genetic Algorithm (GA) approaches have been used to optimize the feedback gains of the SMC applied to a single area non-reheat AGC. In other related work, Particle Swarm Optimization (PSO) was used for the same purpose. In other related work, only the feedback gains were selected optimally. On the other hand, the switching vector was obtained from another design method reported in literature.

Thus, a sliding mode AGC controller and method solving the aforementioned problems is desired.

SUMMARY OF THE INVENTION

The sliding mode AGC controller and method includes Genetic Algorithms (GA) to find the optimal feedback gains and switching vector values of the controller. In order to guarantee enhancement of the system's dynamical performance and a reduction in the SMC chattering, two objective functions were investigated in the optimization process. The tested two-interconnected AGC model incorporates nonlinearities in terms of Generation Rate Constraint (GRC) and a limiter on the integral control value. Comparison with previous AGC methods reported in the literature validates the significance of the proposed SMC design.

These and other features of the present invention will become readily apparent upon further review of the following specification and drawings.

BRIEF DESCRIPTION OF THE DRAWINGS

FIGS. 8A and 8B are plots showing control signals (efforts) for u1 when minimizing J1, and J2, respectively.

FIGS. 9A and 9B: are plots showing control signals (efforts) u2 when minimizing J1 and J2, respectively

Similar reference characters denote corresponding features consistently throughout the attached drawings.

DETAILED DESCRIPTION OF THE PREFERRED EMBODIMENTS

The sliding mode AGC controller and method includes Genetic Algorithms (GA) to find the optimal feedback gains and switching vector values of a sliding mode controller (SMC). In order to guarantee enhancement of the system dynamical performance and a reduction in the SMC chattering, two objective functions are used in the optimization process. The tested two-interconnected AGC model incorporates nonlinearities in terms of Generation Rate Constraint (GRC) and a limiter on the integral control value. Comparison with previous AGC methods reported in the literature validates the significance of the proposed SMC design. An optimal design of the whole sliding mode automatic generation controller parameters (both the feedback gains and the switching vectors) uses the Genetic Algorithm (GA). The controller is applied to a two-areas interconnected nonlinear AGC model. The dynamical behavior of the controlled system is compared to another method reported in the literature.

Figure 1:
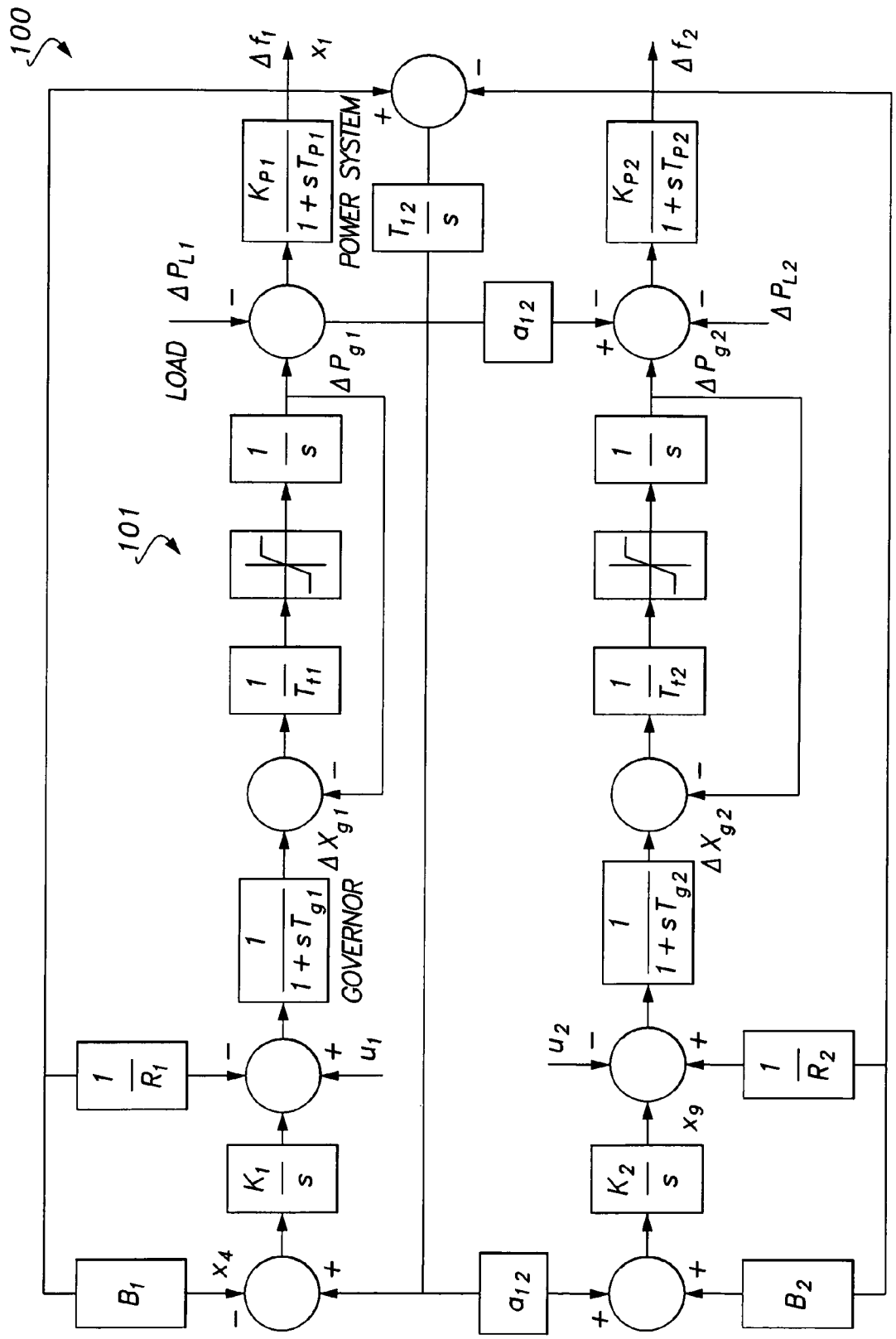
FIG. 1 is a block diagram showing the interconnected power systems under control of a sliding mode AGC controller according to the present invention.

As shown in FIG. 1, exemplary interconnected power generation systems 100 include steam turbine generator subsystems 101, which function as the prime movers for the electrical power generators. The model includes the effect of a Generation Rate Constraint (GRC) and limits on the position of the governor valve, which are caused by the mechanical and thermodynamic constraints in practical steam turbine systems. In addition, a limiter on the integral control value is included to prevent excessive control.

A typical value of 0.015 per unit/min (p.u./min) has been included in the model. $T_p$ is the plant model time constant, $T_t$ is the turbine time constant, $T_g$ is the governor time constant, $K_p$ (Hz/p.u. MW) is the plant gain, K is the integral control gain, and R (Hz/p.u. MW) is the speed regulation due to governor action. The tie line power is $x_5$. On the other hand, $x_7$, $x_8$, and $x_9$ are, respectively, the incremental changes in generator output (p.u. MW), governor valve position (p.u. MW) and integral control of area 2. The control objective in the AGC problem is to keep the change in frequencies (Hz) $\Delta f_1 = x_1$ and $\Delta f_2 = x_6$, as well as the change in tie-line power $\Delta P_{tie} = x_5$ as close to zero as possible when the system is subjected to load disturbance $\Delta P_{L1}$ and $\Delta P_{L2}$ by manipulating the inputs $u_1$ and $u_2$, respectively. The values of the parameters used for the interconnected system are as in Table 1.

TABLE 1

Interconnected system parameters

| | |
|---|---|
| $T_{P1} = T_{p2} = 20$ s | $K_{p1} = K_{p2} = 120$ Hz p.u. $MW^{-1}$ |
| $T_{t1} = T_{t2} = 0.3$ s | $K_1 = K_2 = 1$ p.u. MW $rad^{-1}$ |
| $T_{g1} = T_{g2} = 0.08$ s | $R_1 = R_2 = 2.4$ Hz p.u. $MW^{-1}$ |
| $B_1 = B_2 = 0.425$ p.u. MW/Hz | $T_{12} = 0.545$ p.u. MW |
| $a_{12} = -1$ | GRC (Generation rate constraint) = 0.015 |

It will be understood that the diagrams in the Figures depicting the sliding mode AGC controller are exemplary only, and may be embodied in a dedicated electronic device having a microprocessor, microcontroller, digital signal processor, application specific integrated circuit, field programmable gate array, any combination of the aforementioned devices, or other device that combines the functionality of the sliding mode AGC controller onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the apparatus and steps of the method described herein.

Figure 2:
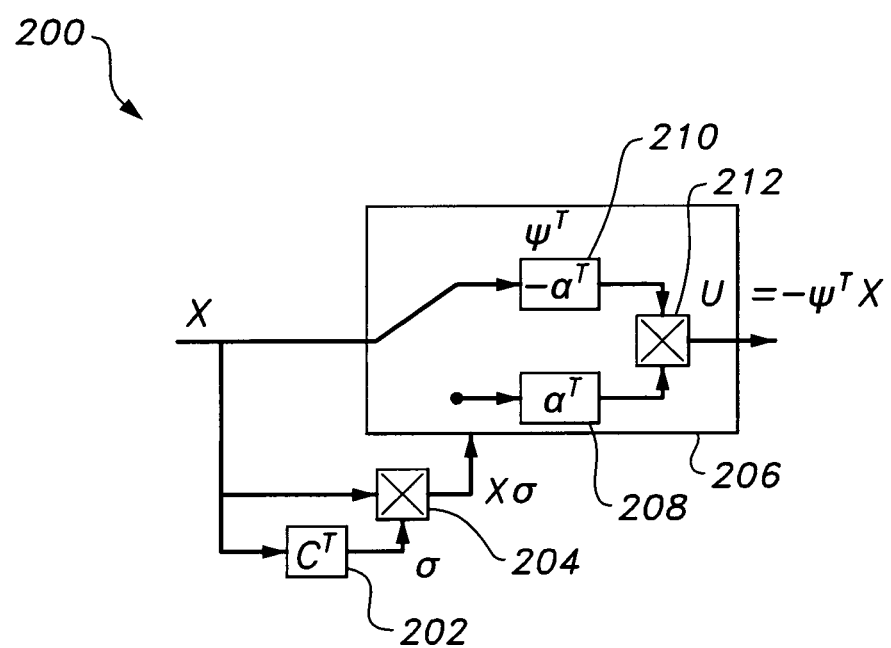
FIG. 2 is a block diagram of the sliding mode AGC controller according to the present invention.

The fundamental theory of SMC is well known to persons having ordinary skill in the art. Different control goals, such as stabilization, tracking, and regulation, can be achieved using SMC by the proper design of the sliding surface. The regulation problem is addressed wherein the objective is to keep specified states as close to zero as possible. The sliding mode AGC controller has a plurality of feedback gain inputs, and a control signal output, the control signal output being adapted for connection to a control input of the two area power generation system 100, the feedback gain inputs being adapted for connection to operating point outputs of the two area power generation system 100. A block diagram of the SMC 200 for the regulation problem is shown in FIG. 2. The output U 212 switches between gain values having $-\alpha^T$ 210 and $+\alpha^T$ 208 based on input X, switching vectors $C^T$ 202, and their product 204. The control law is a linear state feedback whose coefficients are piecewise constant functions. Consider the linear time-invariant controllable system given by:

$$\dot{X}(t) = AX(t) + BU(t) \quad (1)$$

where
  X(t) is an n-dimensional state vector;
  U(t) is an m-dimensional control force vector;
  A is an n×n system matrix, and
  B is an n×m input matrix.

The SMC control laws for the system of (1) are given by $$u_i = -\psi_i^T X = -\sum_{j=1}^{n} \psi_{ij} x_j; \, i = 1, 2, \ldots, m \quad (2)$$

where the feedback gains are given as:

$$\psi_{ij} = \begin{cases} \alpha_{ij}, & \text{if } x_i \sigma_j > 0 \\ -\alpha_{ij}, & \text{if } x_j \sigma_i < 0 \end{cases} \, i = 1, \ldots, m; \, j = 0, \ldots, n \quad (3)$$

and $$\sigma_i(X) = C_i^T X = 0, \, i = 1, \ldots, m$$

where $c_i$'s are the switching vectors, which are selected by pole placement or linear optimal control theory.

Genetic algorithms are directed random search techniques that can find the global optimal solution in complex multidimensional search spaces. GA is an adaptive learning heuristic technique that imitates the natural process of evolution to progress toward the optimum by performing an efficient and systematic search of the solution space. A set of solutions, described as a population of individuals, is encoded as binary strings, termed as chromosomes. This population represents points in the solution space. A new set of solutions, called offspring, are created in a new generation (iteration) by crossing some of the strings of the current generation. This process is called crossover. Furthermore, the crossover is repeated at every generation and new characteristics are introduced to add diversity. The process of altering some of the strings of the offspring randomly is known as mutation. GA employs different genetic operators to manipulate individuals in a population of solutions over several generations to improve their fitness gradually. Normally, the parameters to be optimized are represented in a binary string. To start the optimization, GA uses randomly produced initial solutions created by a random number generator. This method is preferred when a priori knowledge about the problem is not available.

Figure 3:
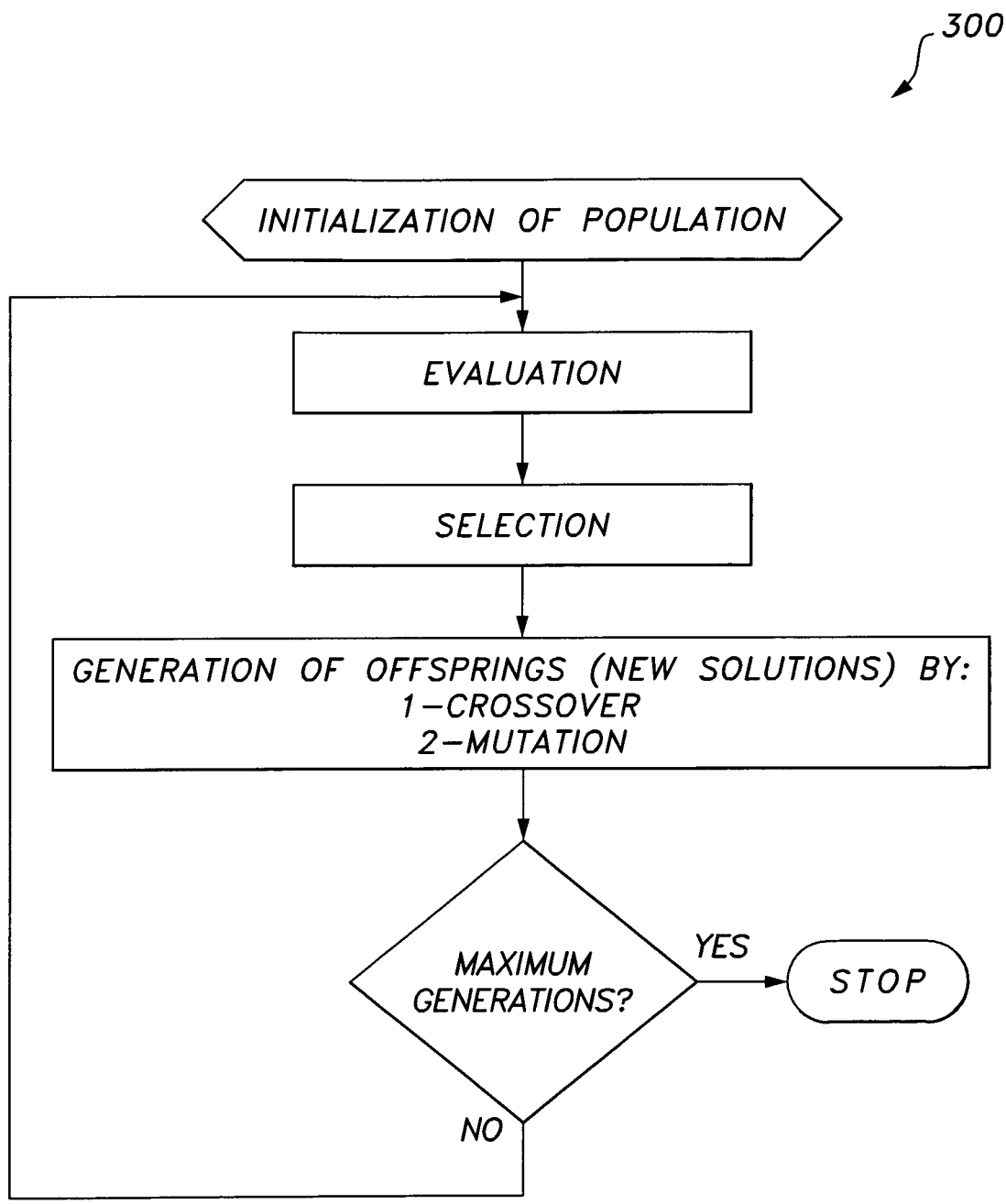
FIG. 3 is a flowchart of a GA used by the sliding mode AGC controller according to the present invention.

The flowchart of a simple GA procedure 300 is shown in FIG. 3. There are basically three genetic operators used to generate and explore the neighborhood of a population and select a new generation. These operators are selection, crossover, and mutation. After randomly generating the initial population of, e.g., N solutions, the GA uses the three genetic operators to yield N new solutions at each iteration. In the selection operation, each solution of the current population is evaluated by its fitness, normally represented by the value of some objective function, and individuals with higher fitness value are selected. Different selection methods, such as stochastic selection or ranking-based selection, can be used.

The crossover operator works on pairs of selected solutions with certain crossover rate. The crossover rate is defined as the probability of applying crossover to a pair of selected solutions. There are many ways of defining this operator. The most common way is called the one-point crossover, which can be described as follows. Given two binary coded solutions of certain bit length, a point is determined randomly in the two strings, and corresponding bits are swapped to generate two new solutions. Mutation is a random alteration with small probability of the binary value of a string position. This operation will prevent GA from being trapped in a local minimum. The fitness evaluation unit in the flowchart acts as an interface between the GA and the optimization problem. Information generated by this unit about the quality of different solutions is used by the selection operation in the GA. The algorithm is repeated until a predefined number of generations have been produced.

The basic steps of GA can be described as follows, and are shown in FIG. 3. Step 1 is the generation of initial population of solutions represented by chromosomes. Step 2 is the evaluation of the solutions generated using the fitness function, which is usually the objective function of the problem under study. Step 3 is the selection of individual solutions that have higher fitness value. There are different selection methods, such as roulette wheel selection, stochastic selection, and Ranking-based selection.

Step 4 is the generation of new offspring from the selected individual solutions. This is done for a certain number of generations using two main operations. One operation is Crossover. There are various Crossover operators. The most common is the one-point crossover. In one-point Crossover, one bit in each solution of two given binary coded solutions, is determined randomly and then swapped to generate two new solutions. The second operation is Mutation, which involves incremental random changes applied in selected offsprings by altering randomly some of their bits. Mutation is usually probabilistically applied to only a few members of the population, and therefore has a small value.

In Step 5, Steps 2 through 4 are repeated until a predefined number of generations have been produced.

In conventional methods of designing SMC, the nonlinear system has to be transformed into a suitable controllable form before the feedback control theory techniques, such as linear optimal control and pole placement, can be applied. In addition, the feedback gains $\alpha_{ij}$ were selected by trial and error. To overcome the above-mentioned two difficulties in the design of SMC, the sliding mode AGC controller provides an optimal design using a GA algorithm. This provides a simple and more systematic way of arriving at the optimal settings of the SMC and cuts down the need for nonlinear or coordinate transformations when studying nonlinear AGC models.

To find the switching vector and feedback gains that minimize an objective function, a load disturbance is applied to the two-area system, and the GA algorithm is used to search for the optimal values of both the switching vector and feedback gains on a pre-defined search space. Any change in the objective function will be reflected in these optimally found values.

Using GA, both the elements of the switching vector and feedback gains of the SM controller, $C_i$ and $\alpha_{ij}$, are determined optimally as follows. (1) Generate random values for feedback gains and switching vector values from a pre-defined space. (2) Evaluate a performance index that reflects the objective of the design. For present purposes, the following two objective functions are used:

$$J_1 = \int_0^\infty 0.75.t|\Delta\omega_1| + t|\Delta\omega_2| + 0.5.t|\Delta P_{tie}|dt \tag{3}$$

$$J_2 = \int_0^\infty \Delta\omega_1^2 + \Delta\omega_2^2 + \Delta P_{tie}^2 + \Delta u_1^2 + \Delta u_2^2 dt \tag{4}$$

(3) Use GA to generate new feedback gains and switching vector values. (4) Evaluate the performance index in step 2 for the new feedback gains and switching vector. Stop if there is no more improvement in the value of the performance index for the last 50 iterations, or if the maximum number of iterations is reached. Otherwise, go to step 3.

The first objective function of step 2 emphasizes improving the dynamical behavior of the AGC system. This was done by including the absolute error time of the internal parameters of the AGC system into the objective function. On the other hand, the second objective function of step 2 includes the deviation of the control effort to reduce the chattering in the control effort signal.

It should be understood, as has been reported in the literature, that the GA algorithm is guaranteed to converge to a global minimum, as the algorithm is designed not to fall in local minima.

The sliding mode AGC controller focuses on SMC design for a two-area interconnected AGC problem including non-linearities. The controller will be compared with a Linear Quadratic Regulator (LQR) design based on structured singular values (SSVs).

In the proposed SM-GA controller, the GA parameters were set as the optimum switching vector values, and the feedback gains were found to be as follows. Using the objective function $J_1$:

$$C_1^T = \begin{bmatrix} 17.0620 & 14.8945 & 4.9056 & 23.4891 & 19.9278 & -0.7254 & 8.7202 & 5.4855 & 1.1284 \\ 11.8467 & 6.1719 & 4.0573 & 15.0380 & 18.3914 & 20.6820 & 25.6712 & 17.1209 & 22.3109 \end{bmatrix}$$

$$\alpha_1 = \begin{bmatrix} 3.5751 & 4.0484 & 1.5769 & 5.8136 & 3.2300 & 0.4441 & 5.0872 & 1.3243 & 7.4557 \\ 2.5144 & 0.2132 & 1.3909 & 0.5006 & 8.8998 & 0.7260 & 3.6326 & 5.9606 & 0.8096 \end{bmatrix}$$

Using the objective function $J_2$:

$$C_2^T = \begin{bmatrix} 29.1559 & 15.5157 & 10.9371 & 29.9919 & 17.4893 & 8.4144 & 20.9650 & 15.7446 & 15.9439 \\ 23.6313 & 2.9241 & 8.8227 & 16.0523 & -2.9328 & -0.6177 & -2.1126 & 26.8925 & 0.6376 \end{bmatrix}$$

$$\alpha_2 = \begin{bmatrix} 2.4164 & 0.0010 & 0.0175 & 0.0010 & 0.0010 & 0.0010 & 5.8201 & 1.2820 & 0.0010 \\ 4.0454 & 4.0643 & 0.0121 & 2.8374 & 7.0902 & 6.8646 & 0.7096 & 4.2269 & 3.5232 \end{bmatrix}$$

Figure 4:
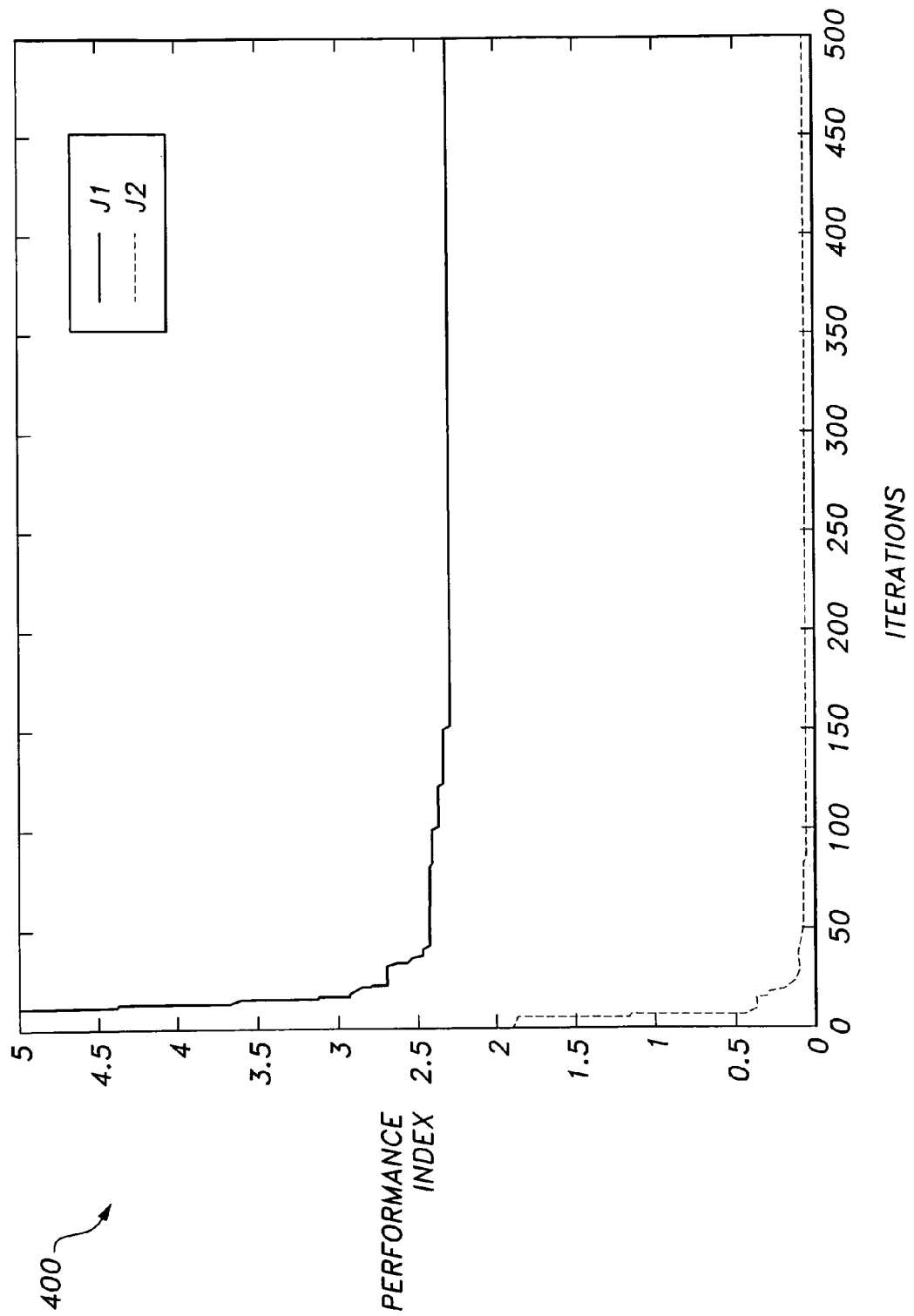
FIG. 4 is a plot showing convergence of the two performance indices J1 and J2.

Plot 400 of FIG. 4 shows the fast convergence of the performance indices $J_1$ and $J_2$.

Figure 5:
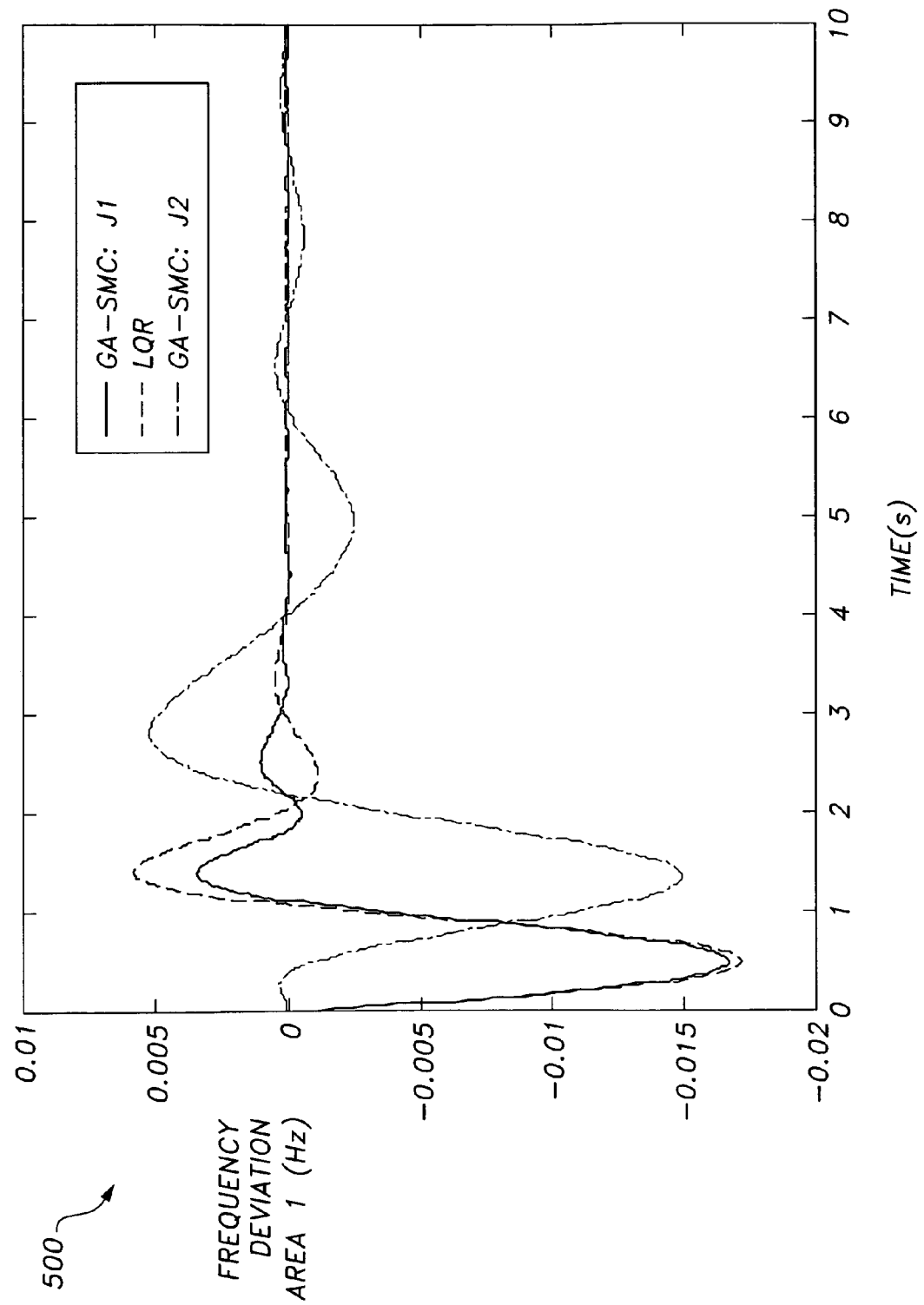
FIG. 5 is a plot showing a comparison of frequency deviation in area 1 when using GA SMC controllers and an LQR controller.
Figure 6:
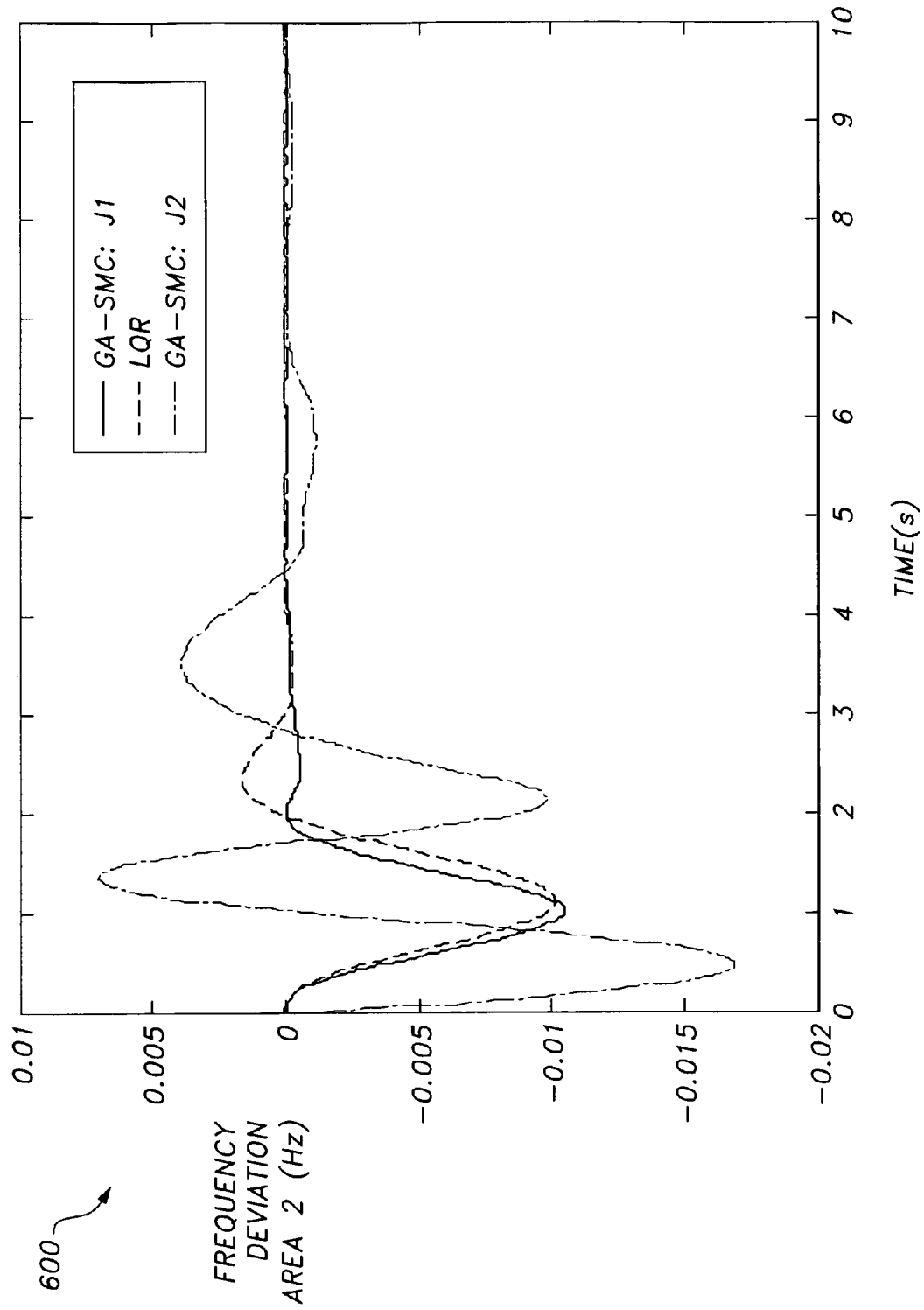
FIG. 6 is a plot showing a comparison of frequency deviation in area 2 when using GA SMC controllers and an LQR controller.
Figure 7:
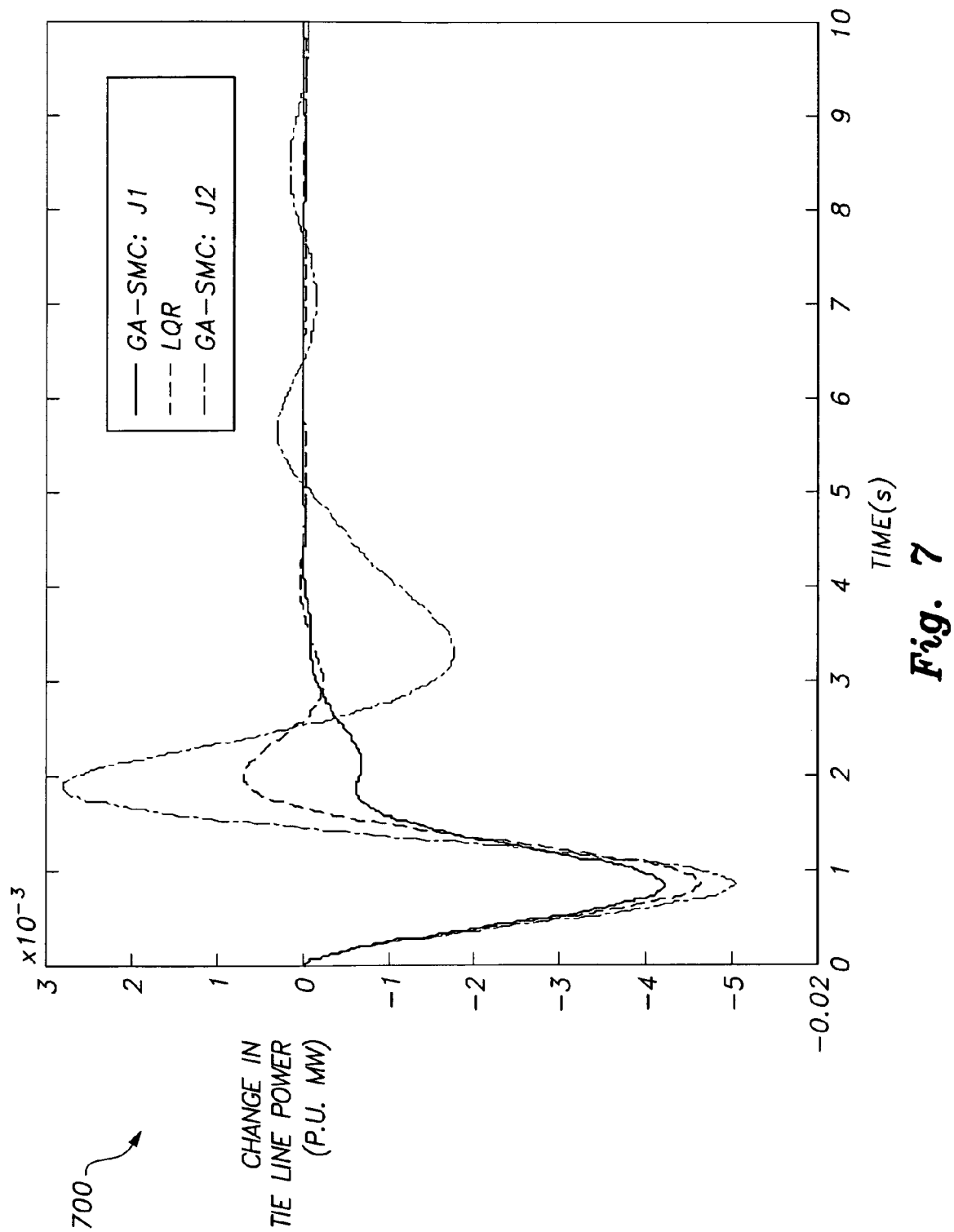
FIG. 7 is a plot showing a comparison of tie-line power deviation when using a sliding mode AGC controller according to the present invention and an LQR controller.

When using the optimally found SMC switching vector and feedback gain values for $J_1$ and $J_2$, the dynamical behavior of the system (deviation in frequency of area 1, deviation in frequency of area 2, and deviation in tie line power) after 0.01 p.u. load disturbance in area 1 is shown in plots 500, 600, and 700 of FIGS. 5-7, respectively. It is clear that using the optimum switching vector and feedback gains of the SMC obtained by minimizing the objective function $J_1$ improved the response of the system in comparison with the dynamics of the optimal integral control and LQR design methods.

However, more chattering is noticed in the control signal $u_1$ and $u_2$, as shown in plots 800 and 900 of FIGS. 8A and 9A, respectively. On the other hand, using the switching vector and feedback gains obtained when minimizing the objective function $J_2$ reduced dramatically the chattering in the control signals, as shown in plots 802 and 902 of FIGS. 8B and 9B, respectively. This enhancement of the control signal is at the expense of some degradation (but still acceptable) in the dynamical behavior of the system performance.

Figure 10:
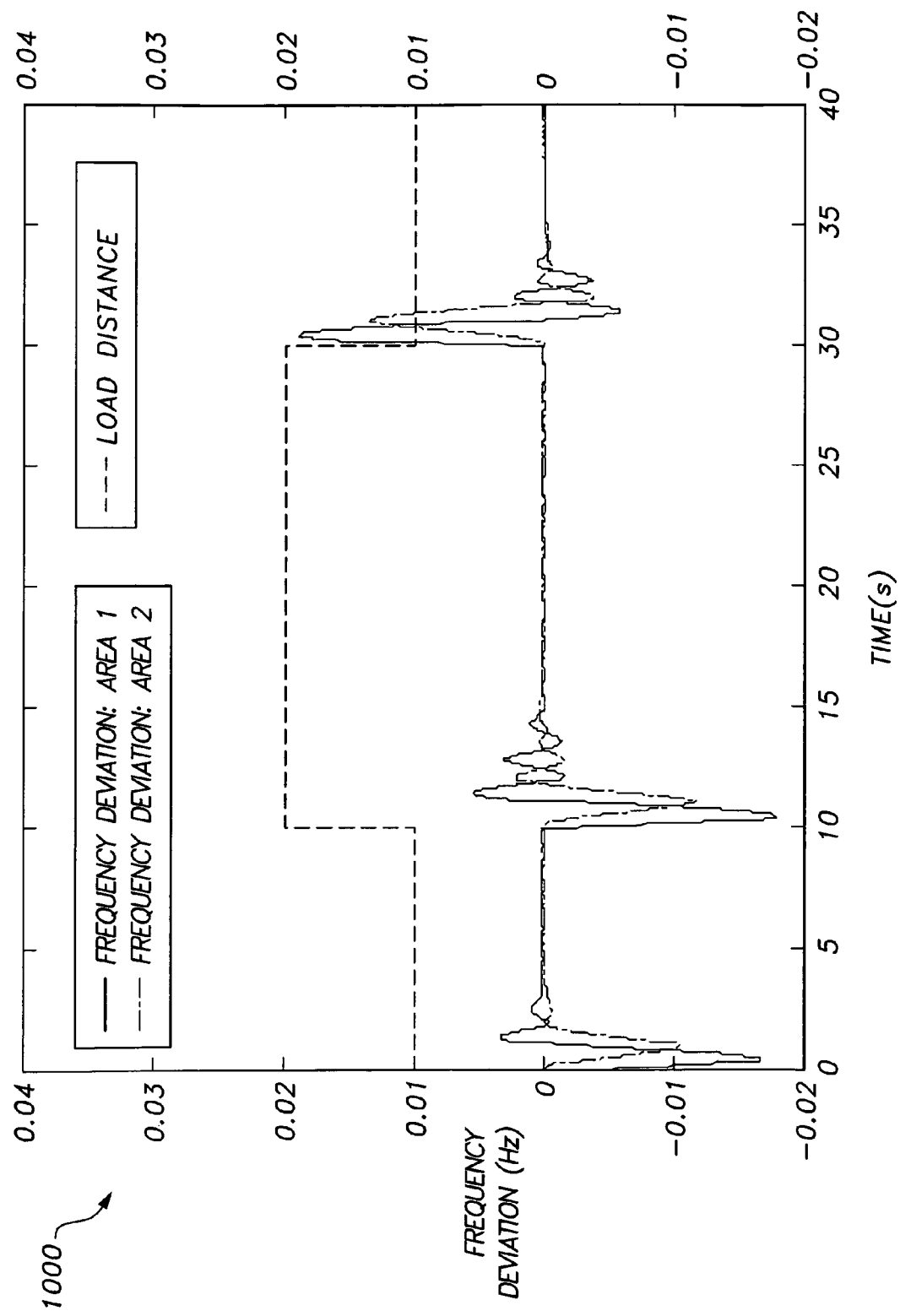
FIG. 10 is a plot showing frequency deviation with rapid load variation.

To demonstrate the effectiveness of the proposed SMC-GA controller when the load disturbance is different than the one designed for, the load has been changed to 0.01 p.u for 10 seconds then increased to 0.02 p.u for the next 20 seconds and then back to 0.01 p.u. This load variation and the change in frequency of areas 1 and 2 are shown in plot 1000 of FIG. 10. It is clear that the proposed SMC-GA controller performs well with this variation in load.

An efficient sliding mode AGC controller (SMC) has been designed with a chattering reduction feature. Unlike the classical sliding mode controller design reported in the literature, the proposed SM controller optimal feedback gains and switching vector values are selected based on formulating the SMC design as an optimization problem. The dynamical behavior and control efforts were investigated when using two performance indices. The first performance index emphasizes improving the dynamical behavior of the AGC system. On the other hand, the second performance index includes the deviation of the control effort to reduce the chattering in the control effort signal. The proposed controller has been applied effectively on a two-area AGC problem with nonlinearities in the model. The dynamical performance of the system and chattering reduction feature when using the proposed controller are enhanced as compared to the dynamics when using previous controllers. The performance of the proposed SMC-GA controller under rapid load variations is satisfactory.

It is to be understood that the present invention is not limited to the embodiment described above, but encompasses any and all embodiments within the scope of the following claims.

We claim:

1. A sliding mode automatic generation control controller, comprising:
   a sliding mode controller having a plurality of feedback gain inputs, and a control signal output, the control signal output being adapted for connection to a control input of a circuit under control, the feedback gain inputs being adapted for connection to operating point outputs of the circuit under control, the sliding mode controller generating a plurality of switching vectors and, generating a plurality of feedback gain outputs responsive to the operating point outputs and the switching vectors;
   means for applying a load disturbance to the circuit under control; and
   a genetic algorithmic optimizer connected to the sliding mode controller, the genetic algorithmic optimizer having an output responsive to the load disturbance, the genetic algorithmic optimizer including:
      means for searching for optimal values of both the switching vectors and the feedback gain outputs on a predefined search space; and
      means for determining the optimal values by minimizing a plurality of objective functions used by the genetic algorithmic optimizer, wherein said means for determining the optimal values comprises:
      means for evaluating a first objective function $J_1$ characterized by the equation $$J_1 = \int_0^\infty 0.75t|\Delta\omega_1| + t|\Delta\omega_2| + 0.5t|\Delta P_{tie}|dt,$$

wherein t represents time, $\Delta\omega_1$ and $\Delta\omega_2$ represent first and second changes in frequency, respectively, and $\Delta P_{tie}$ represents a change in tie line power; and
      means for evaluating a second objective $J_2$ function characterized by the equation $$J_2 = \int_0^\infty (\Delta\omega_1^2 + \Delta\omega_2^2 + \Delta P_{tie}^2 + \Delta u_1^2 + \Delta u_2^2)dt,$$

whereby $\Delta u_1$ and $\Delta u_2$ represent changes in first and second inputs, respectively, thereby minimizing frequency deviation and tie line power of the two interconnected electrical power generating systems.

2. The sliding mode automatic generation control controller according to claim 1, wherein the circuit under control is comprised of two interconnected electrical power generating systems having a system frequency and a tie line power.

3. A sliding mode automatic generation control control method for a sliding mode controller connected to two interconnected electrical power generating systems, the power systems having a system frequency, a tie line power and a plurality of operating point outputs, the method comprising the step of using a genetic algorithm to perform the steps of:
   (a) generating a plurality of switching vectors;
   (b) generating a plurality of feedback gain outputs responsive to the operating point outputs and the switching vectors;
   (c) searching for optimal values of both the switching vectors and the feedback gain outputs on a predefined search space; and
   (d) determining the optimal values minimizing a plurality of objective functions used by the genetic algorithm, wherein the step of determining the optimal values comprises the steps of:
      (e) minimizing a first objective function $J_1$ characterized by the equation $$J_1 = \int_0^\infty 0.75t|\Delta\omega_1| + t|\Delta\omega_2| + 0.5t|\Delta P_{tie}|dt,$$

wherein t represents time, $\Delta\omega_1$ and $\Delta\omega_2$ represent first and second changes in frequency, respectively, and $\Delta P_{tie}$ represents a change in tie line power; and (f) minimizing a second objective $J_2$ function characterized by the equation $$J_2 = \int_0^\infty (\Delta\omega_1^2 + \Delta\omega_2^2 + \Delta P_{tie}^2 + \Delta u_1^2 + \Delta u_2^2)dt,$$

whereby $\Delta u_1$ and $\Delta u_2$ represent changes in first and second inputs, respectively, thereby minimizing frequency deviation and tie line power of the two interconnected electrical power generating systems.

4. The sliding mode automatic generation control control method according to claim 3, further comprising the step of iteratively performing steps (a) through (f) until a stopping criterion has been reached.

\* \* \* \* \*